United States Patent

[11] 3,528,345

| [72] | Inventor | Rollin Douglas Rumsey, Buffalo, New York |
|---|---|---|
| [21] | Appl. No. | 704,730 |
| [22] | Filed | Feb. 12, 1968 |
| [45] | Patented | Sept. 15, 1970 |
| [73] | Assignee | Houdaille Industries, Inc., Buffalo, New York a corporation of Michigan |

[54] LONG TRAVEL ROTARY ACTUATOR/DAMPER
8 Claims, 5 Drawing Figs.

[52] U.S. Cl. .................................................. 92/120, 92/165, 92/168, 103/126
[51] Int. Cl. ................................................ F01c 9/00, F16j 15/18
[50] Field of Search ........................................ 92/120, 165, 168; 73/252; 277/144, 145, 165; 103/126TR; 308/36.1, 36.2, 3.5

[56] References Cited
UNITED STATES PATENTS

| 1,459,552 | 6/1923 | Rathman ............ | 103/126(TR)UX |
| 2,029,742 | 2/1936 | Sieverts .............. | 103/126(TR)UX |
| 2,095,404 | 10/1937 | Wurr .................. | 92/120 |
| 2,358,361 | 9/1944 | Svenson ............. | 103/126(TR)UX |
| 2,798,778 | 9/1957 | Flick ................... | 92/168 |
| 2,854,956 | 10/1958 | Hager .................. | 92/121X |
| 2,931,671 | 5/1960 | Beeley ................. | 277/145X |
| 3,011,803 | 12/1961 | Buckner et al. ....... | 277/165X |
| 3,077,839 | 2/1963 | Gondek ................ | 103/126(TR)UX |
| 3,155,013 | 11/1964 | Rumsey ............... | 92/120X |
| 3,181,513 | 5/1965 | Young .................. | 92/121X |
| 2,286,031 | 6/1942 | Bowering ............. | 103/126(TR)UX |
| 3,379,100 | 4/1968 | Rumsey et al. ....... | 92/120X |
| 1,271,970 | 7/1918 | Wood ................... | 103/126(TR)UX |
| 2,814,449 | 11/1957 | Wieczorek ........... | 308/36.1X |
| 3,224,817 | 12/1965 | Miller et al. .......... | 308/3.5 |
| 3,269,737 | 8/1966 | Freese .................. | 92/165X |
| 3,369,461 | 2/1968 | De Biasi ............... | 308/36.1X |

*Primary Examiner*—Martin P. Schwadron
*Assistant Examiner*—Leslie J. Payne
*Attorney*—Hill, Sherman, Meroni, Gross and Simpson ABSTRACT: A rotary actuator/damper has within its working chamber one or more planet gears meshing with an internal ring gear on the housing and a sun gear on the rotary shaft, at least one abutment fixed with respect to the housing and ring gear and slidably cooperating with the sun gear, and fluid in the chamber controlling the planet gears.

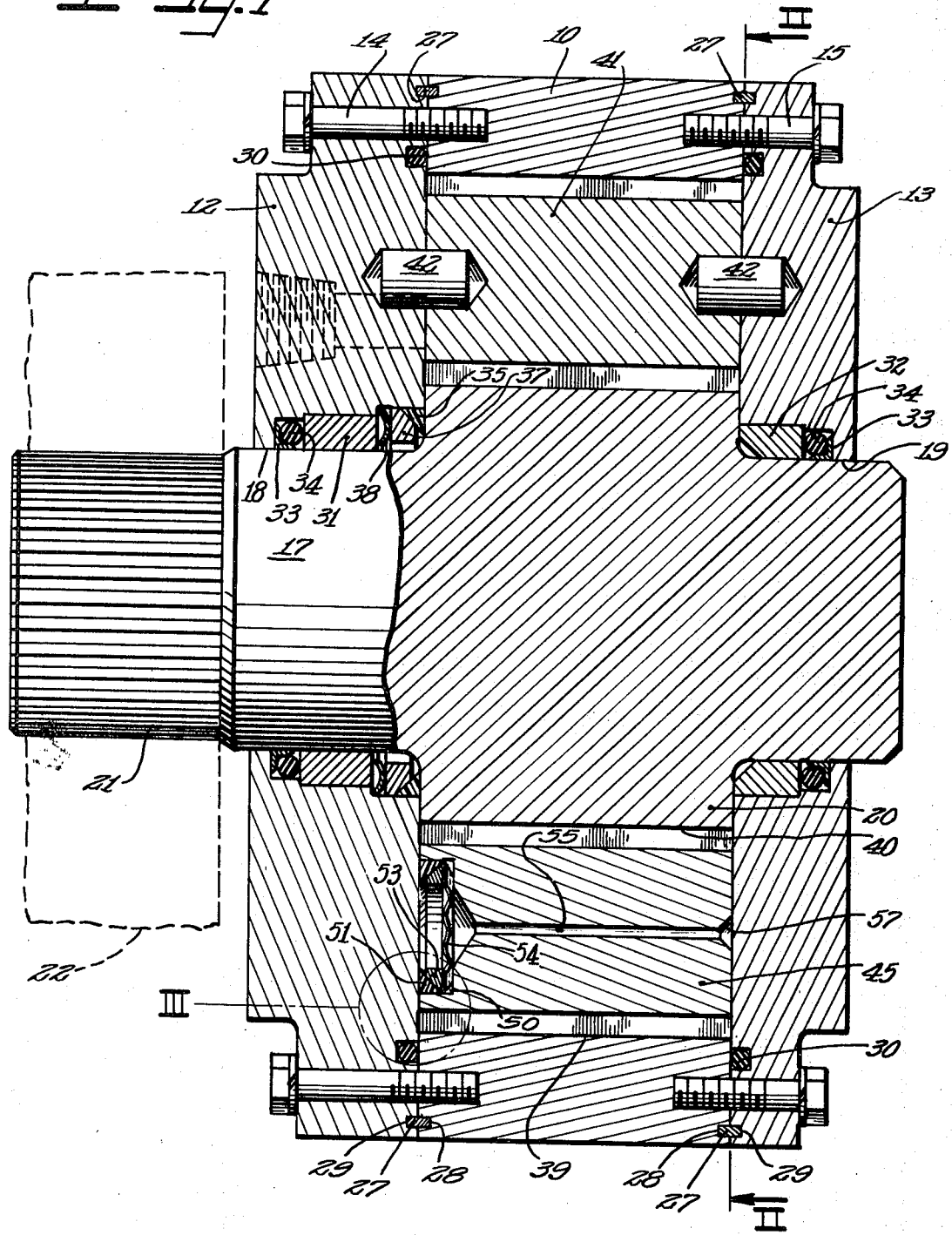

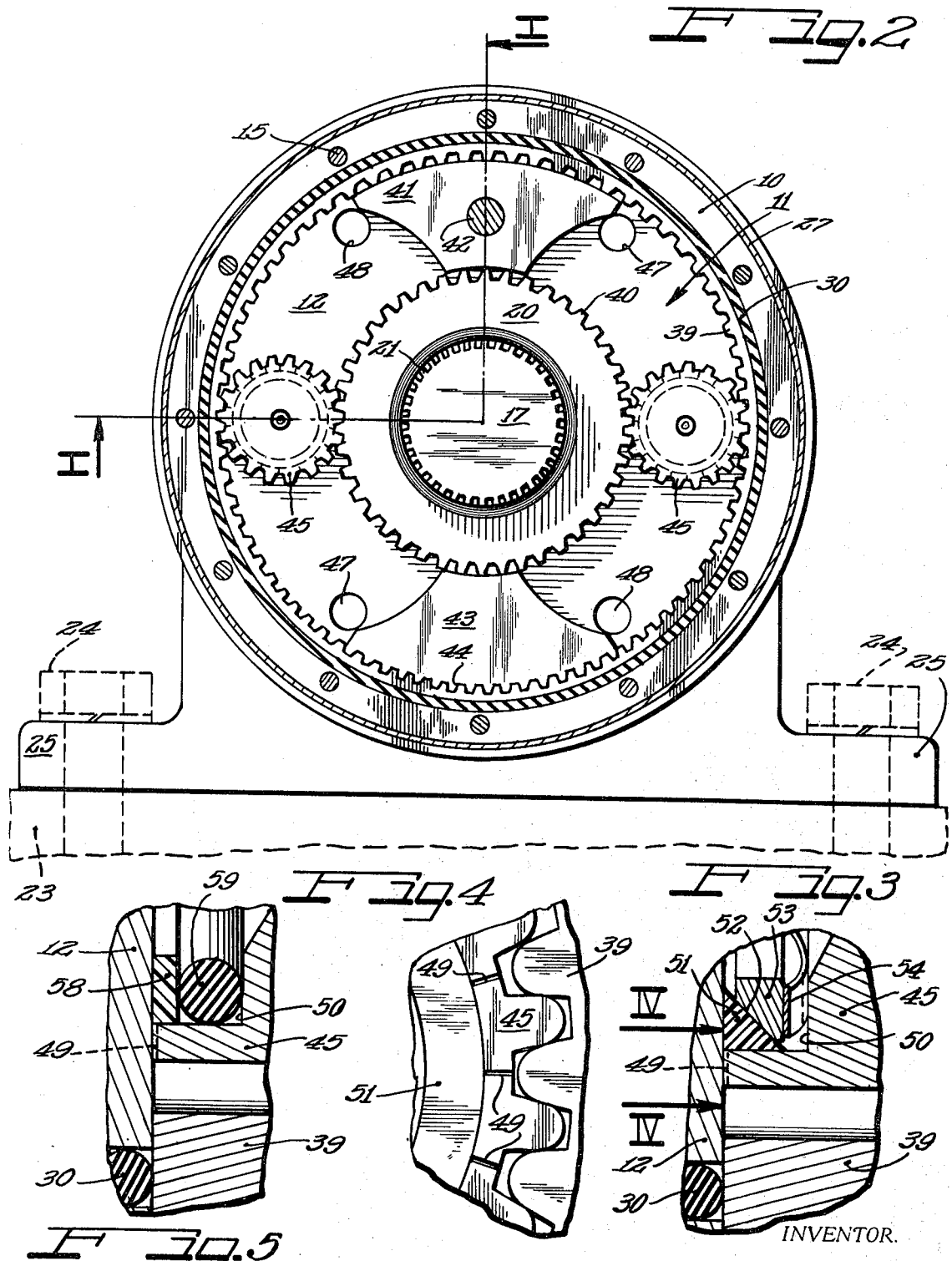

LONG TRAVEL ROTARY ACTUATOR/DAMPER

This invention relates to oscillatably rotatable actuator/damper structures, and is more particularly concerned with such structures having greatly increased range of travel as compared with prior structures of this kind.

There are many uses where it would be desirable to have an oscillatably rotary actuator/damper capable of in excess of 180° travel but in which the conventional vane type of structure presents problems. For example, space limitations may require that the actuator/damper unit must be long in proportion to its diameter, or at least preclude sufficient space in which to install adequate bearings to carry the hydraulically unbalanced side loads imposed on a single vane wing shaft unit. For some purposes it is desirable to enable shaft travel through as much as 360° or even more than one revolution, which cannot be attained with the vane type rotary actuator/damper.

It is, accordingly, an important object of the present invention to provide a new and improved oscillatably rotary actuator/damper having substantially greater travel range than a comparable vane type actuator/damper.

Another object of the invention is to provide a new and improved oscillatably rotatable actuator/damper embodying fluid-controlled gear means.

A further object of the invention is to provide a new and improved rotary actuator/damper construction employing planet gear means to control relative rotation of the shaft and housing, which may have novel means to minimize leakage across the planet gear means but avoiding undesirable trapping of fluid between meshing gears.

Other objects, features and advantages of the present invention will be readily apparent from the following detailed description of certain preferred embodiments thereof taken in conjunction with the accompanying drawings in which:

FIG. 1 is a longitudinal developed sectional detail view through an actuator/damper embodying features of the invention, and taken along substantially the line I—I of FIG. 2;

FIG. 2 is an end elevational and sectional detail view of the damper taken substantially along the line II—II of FIG. 1;

FIG. 3 is an enlarged fragmentary sectional detail of substantially the area III on FIG. 1;

FIG. 4 is a fragmentary elevational detail view taken substantially along the line IV—IV of FIG. 3; and FIG. 5 is similar to FIG. 3, but showing a modification.

An oscillatably rotary actuator/damper embodying features of the invention and as exemplified in FIGS. 1 and 2 has a housing comprising a ring-shaped body 10 of suitable length and diameter defining therein a working chamber 11 closed at one end by an end closure cover member disk 12 and at the opposite end by an end closure cover member disk 13 respectively secured to the body ring 10 as by means of bolts 14 and 15, respectively. Extending concentrically and relatively rotatably through the chamber 11 is a shaft 17 journalled in respective concentric bores 18 and 19 in the end covers 12 and 13 and having a hub 20 which is of larger diameter than the cover bores but of substantially smaller diameter than the inside of the body ring 10, with the axially facing ends of the hub 20 closely slidably confronting the respective end closures. On at least one outwardly projecting end portion of the shaft 17, means such as splines 21 are provided for attachment of the shaft co-rotatively to a member 22 of apparatus with which the actuator/damper unit is adapted to be used, while the housing is adapted to be secured to another member 23 of the apparatus as by means of bolts 24 clamping thereto attachment flanges 25 integral with at least one of the parts of the housing such as the body 10, although such flanges may also be on one or more of the closures.

Concentricity of the end covers 12 and 13 is maintained, in addition to the bolts 14 and 15, by means such as conventional dowels, but may also or alternatively be maintained by rectangular transverse cross section respective keys 27 extending across the joints between the confronting axially facing surfaces of the end covers and the housing ring 10 adjacent to the outer perimeter of the housing ring and seated in matching grooves 28 and 29 in the confronting surfaces of respectively the body ring 10 and the end covers. Desirably the keys 27 and the grooves within which seated are generally arcuate, such as annular as shown, but they may be segmental if preferred.

Sealing against fluid leakage from within the working chamber 11 along the joints between the housing body ring 10 and the covers 12 and 13 is effected by respective static sealing rings 30 carried by the end covers and pressing against the confronting ends of the body ring 10 adjacent to the working chamber. Along the shaft 17, respective dynamic seals are carried by the end cover members. Carried by the end cover 12 is an annular bushing shaft bearing 31 and carried by the end cover 13 is an annular bushing shaft bearing 32. Along the outer ends of these bushing bearings the respective end covers carry identical shaft seals comprising L-shaped sealing rings 33 thrust into the joint between the shaft and the end cover by means of a compression ring 34. Although no hub seal may be necessary, as is apparent between the end cover 13 and the hub 20, a hub seal may be provided with respect to either or both of the end covers or closures, as is shown between the end cover 12 and the hub 20 and comprising a triangular cross section sealing ring 35, a rigid thrusting wedge ring 37 and a biasing wave spring 38 by which the ring 37 is maintained under constant pressure against the sealing ring 35 to press the latter into sealing relation to the joint between the end cover and the hub, within the respective bearing-and-seal-containing rabbet groove in the cover opening toward the shaft and the hub.

According to the present invention, means are provided for controlling relative rotary movements of the housing and shaft of the actuator/damper utilizing, instead of the customary wing shaft vanes and abutments an arrangement of planetary gear structure in association with fixed abutment means, and thereby attaining substantially greater range of rotary oscillations than with the prior vane-type arrangements. To this end, internal ring gear means 39 are concentrically spaced about the shaft 17 in fixed relation to the housing within the working chamber 11, and in a preferred form integral with the inner perimeter of the housing body ring 10. Sun gear means 40 are provided co-rotative with the shaft 17 in the chamber 11 and of substantially smaller diameter than the ring gear means 39. Desirably the sun gear means 40 are formed integrally with the hub 20.

Abutment means are provided between the ring gear 39 and the sun gear 40 and fixed with respect to the housing and to the ring gear. For this purpose at least one abutment 41 is provided which is of suitable rigid construction having an outer arcuate perimeter in engagement with the teeth of the ring gear 39 and an inner arcuate perimeter complementary to and slidably engaging the crowns of the teeth of the sun gear 40. Anchorage of the abutment 41 fixedly to the housing is effected by means of dowels 42 extending within and between the ends of the abutment and the end covers 12 and 13. For balanced operation a plurality of abutments are desirably used and in the illustrated unit two diametrically opposite abutments are employed comprising the abutment 41 and an opposite abutment 43 which is similar in general construction, but is shown as having segmental gear teeth 44 which mesh with the teeth of the ring gear 39 and thus anchor the abutment 43. In addition, if desired, dowel anchoring means may also be employed.

Planet gear means comprising respective planet gears 45 are located in each of the subchambers into which the working chamber 11 is divided by the abutments 41 and 43. The planet gears 45 mesh with the ring gear 39 and the sun gear 40 and are free to run the full extent between the sides of the abutments defining the respective opposite ends of the working subchamber in which each planet gear is located.

Within the working chamber is fluid for controlling the planet gear means, and desirably comprisig a suitable hydraulic operating oil. The controlling fluid is suitably introduced into and displaced from the respective subchambers in any preferred manner as, for example, through respective sets of ports 47 and 48 communicating with the working chamber through either of the end cover members, herein shown as the cover member 12. One of each of the ports 47 is located at the same side of each of the abutments 41 and 43, and one of each of the ports 48 is located adjacent to the opposite side of each of the abutments 41 and 43. In a control system the ports 47 are suitably connected, and the ports 48 are suitably connected for effecting the desired control of the unit through the planet gears 45.

For rotary actuator purposes, hydraulic fluid introduced into the working chamber 11 through the ports 47 will act on the planet gears 45 to drive the same toward the ports 48 through which fluid is displaced from the working chamber. Conversely, introduction of hydraulic fluid through the ports 48 drives the planet gears 45 toward the ports 47 which then receive fluid displaced from the working chamber. Where the housing is held stationary, pressure fluid actuation of the planet gears 45 causes rotary movement of the sun gear 40 and thereby the shaft 17 as the planet gears run along the ring gear 39 in either respective direction. Where, on the other hand, the shaft 17 is held stationary, operation of the planet gears 45 will cause relative rotation of the ring gear 39 and thereby the housing as the planet gears run along the sun gear 40. Limits of relative rotary motion are defined by the abutments 41 and 43 serving as stops for the planet gears 45. With proper choice of diameters, the ratio of shaft travel to planet travel in a two abutment arrangement as shown in FIG. 2 within the working chamber of the actuator, can be as high as 3:1. Therefore the shaft can be made to travel through as much as 360° in an actuator with two planet gears as shown. If three or four planet gears and corresponding number of abutments are employed, much less travel would be achieved, of course. Further, if only one abutment and one planet gear are used within the working chamber considerably greater relative rotary travel can be effected, for example, in excess of two revolutions.

Between actuations, or altogether, the unit may be employed as an energy absorbing device or damper. For this purpose the related ports 47, 47 and 48, 48 may be connected with each other and with the other ports through suitable damping valving to resist displacement within predetermined parameters. Low force magnitude oscillatory shocks or vibrations are damped, at least in part, by yieldable resistance to relative torsional movement between the housing and the shaft afforded by the low volume displacement of fluid accommodated in the grooves between the teeth of the sun gear 40 past the confronting concave surfaces of the abutments 41 and 43. That is, assuming the fluid system through the ports 47 and 48 as either locked or valved to withstand a predetermined blow-off or damping pressure response, at torque forces below that established for the system valving the low volume fluid displacement by way of the sun gear tooth grooves becomes effective on the order of a damping orifice.

In order to minimize leakage across the ends of the several gears in the actuator/damper unit, it is desirable to have as close as practicable a fit between the end faces of the several gears and the end covers 12 and 13. Where this fit is of such close tolerance that there is liability of trapping of hydraulic fluid in the root areas between the meshing teeth of the planet gears 45 and the ring gear 39 and the sun gear 40, undesirable loading and straining of the system may result. To overcome this condition, pressure relief means are provided comprising anti-trapping notches or shallow grooves 49 (FIGS. 2—4) in one end face of each of the planet gears 45 extending generally radially from each root area between teeth and effecting communication thereof with a central relief cavity 50 in that end face. Normally, the ends of the relief grooves 49 opening into the cavity 50 are sealed off from the cavity as by means of a sealing ring 51 of triangular transverse cross section having a hypotenuse-oblique camming surface 52 facing generally radially and axially inwardly with respect to the relief cavity or recess 50 and with its apex opposite the camming surface sealingly engaging at the joint between the confronting end faces of the planet gear and the end cover and across the ends of the grooves 49. This sealing ring may be of the long-wearing, minimum friction type comprising a material having the desirable characteristics of polytetrafluoroethylene. It is thrust into positive, take-up sealing relation by means comprising a rigid pressure wedge ring 53 engaging the camming surface 52 and maintained under yieldable thrusting pressure by biasing means conveniently comprising a wave spring 54 which is backed in loaded condition against the surface defining the bottom of the relief recess 50. When the pressure in the root area between the planet gear teeth in mesh with either the ring gear 39 or the sun gear 40 exceeds the pressure in the relief recess cavity 50, the trapped pressurized fluid will push the sealing rings 51 aside and leak or escape into the relief cavity. In order to equalize the pressure on both end faces of the planet gears 45, an equalizing bore 55 in each of them effects communication between the relief cavity 50 and the opposite end face of the gear and which may have a flaring mouth enlargement 57 from the bore. Of course, if sufficient axial clearance is permitted, as when leakage losses are not a critical factor in the operation of the unit, the anti-trapping provision between gear teeth of the planet gears may be omitted. For many, and possibly most, applications, the tooth-relief feature will be desirable.

Another and simpler pressure relief groove seal is shown in FIG. 5, comprising a seal ring 58 of generally quadrangular transverse cross section having an end face against the confronting end face of the end cover member and its outer perimeter in sealing relation to the inner ends of the relief grooves 49. Sealing pressure is maintained against the sealing ring 58 by an elastomeric pressure ring 59 maintained under compression load between the the seal ring 58 and the surface defining the bottom of the pressure relief cavity 50.

From the foregoing it is apparent that the present invention provides a new and improved rotary actuator/damper in which relative rotary displacement between the housing and the shaft is enabled to be significantly and advantageously in excess of the extreme limits permitted with a comparable vane type unit. While it is appreciated that internal leakage may preclude use of the planetary gear arrangement of the present invention because drift cannnot be tolerated, there are numerous applications where that is not a problem, such as where the device is used on a hinge line as on doors mounted in a vertical plane. Other notable uses for units according to the present invention are, for example, in the steering gear of articulated vehicles such as earth scrapers, in the swing motion on back-hoes, in the damping of the fifth wheel on tractor trailer rigs at the kingpin, in steering nosewheel tractors, aircraft and helicopters, as well as fork lift trucks and straddle carriers having an extremely high steering angle, in the hinge line of shovel dipper doors and various clam shell and front end loader buckets where either damping or actuation is required through an angle approaching or greater than 180° grapple swings where rotation up to 360° is desired but not normally available, etc. An especially valuable application of the present invention is in those situations where rotary actuation or at least displacement is required having in excess of 180° travel, which either must be long in proportion to its diameter or in which there is not space in which to install adequate bearings to carry the hydraulic unbalanced side loads imposed on a single vane actuator of the rotary vane type, and wherein an actuator according to the present invention having a balanced arrangement of two or more abutments and planet gears may be employed.

It will be understood that variations and modifications may be effected without departing from the spirit and scope of the novel concepts of this invention.

I claim:

1. In a rotary actuator/damper structure having a housing providing a working chamber with a shaft extending therethrough:

internal ring gear means concentrically spaced about said shaft in fixed relation to the housing within said chamber;

a sun gear co-rotative with the shaft in said chamber and of substantially smaller diameter than said ring gear;

abutment means between said ring gear means and said sun gear and fixed with respect to said housing and ring gear means;

planet gear means meshing with said ring gear means and said sun gear and controlling relative oscillatory rotary movements of said housing and said shaft;

fluid in said chamber controlling said planet gear means;

said abutment means comprising an abutment member having a radially outer perimeter engaging the teeth of the ring gear means and a radially inner perimeter slidably engaging the teeth of the sun gear; and segmental gear teeth on the outer perimeter of the abutment member lockingly meshing with the teeth of the ring gear.

2. In a rotary actuator/damper structure having a housing providing a working chamber with a shaft extending therethrough:

internal ring gear means concentrically spaced about said shaft in fixed relation to the housing within said chamber;

a sun gear co-rotative with the shaft in said chamber and of substantially smaller diameter than said ring gear;

abutment means between said ring gear means and said sun gear and fixed with respect to said housing and ring gear means;

planet gear means meshing with said ring gear means and said sun gear and controlling relative oscillatory rotary movements of said housing and said shaft;

fluid in said chamber controlling said planet gear means;

said planet gear means comprising a planet gear member having opposite end faces, said housing having surfaces in close slidable confronting relation to said end faces, and means on an end face of said planet gear member for relieving pressure of fluid trapped between the planet gear teeth and the teeth of the ring gear means and the sun gear comprising a relief cavity in said end face and relief grooves in said end face communicating said cavity with the root areas between the teeth.

3. A structure according to claim 2, sealing ring means in said cavity normally sealing the cavity ends of said grooves and being displaceable by force of pressure of the trapped fluid to permit leakage into the cavity when the pressure in the cavity is less than the trapped fluid pressure.

4. A structure according to claim 3, including means normally yieldably biasing said sealing means into groove-end sealing relation.

5. A structure according to claim 4, said sealing means comprising a sealing ring of generally triangular transverse cross section having a camming surface facing into said cavity, a wedging thrust ring engaging said camming surface, and said biasing means comprising a spring maintaining thrusting pressure on said thrust ring and being in loading engagement against a surface within said cavity.

6. In a rotary actuator/damper structure having a housing providing a working chamber with a shaft extending therethrough:

internal ring gear means concentrically spaced about said shaft in fixed relation to the housing within said chamber;

a sun gear co-rotative with the shaft in said chamber and of substantially smaller diameter than said ring gear;

abutment means between said ring gear means and said sun gear and fixed with respect to said housing and ring gear means;

planet gear means meshing with said ring gear means and said sun gear and controlling relative oscillatory rotary movements of said housing and said shaft;

fluid in said chamber controlling said planet gear means;

said shaft having a hub in said working chamber;

said housing having end closures journalling said shaft and being in confronting relation to axial end faces on said hub;

said end closures having respective rabbet grooves each of which opens toward said shaft and toward said hub;

shaft bearing bushings received in said rabbet grooves and engaging about the shaft;

sealing rings in said grooves and engaging at the joints between the shaft and the respective end closures;

compression rings engaging said sealing rings and said bearing bushings and maintaining said sealing rings under sealing pressure toward said joints;

a second sealing ring in at least one of said grooves thrusting toward the joint between the associated end closure and the hub; and biasing means between said bearing bushing in said groove and said second sealing ring and maintaining sealing pressure on said second sealing ring.

7. A structure according to claim 6, said second sealing ring having a cam face thereon, a wedge thrusting ring engaging said cam face, and said biasing means thrusting said thrusting ring against the second sealing ring cam face.

8. A structure in accordance with claim 6, in which the first mentioned sealing rings are generally L-shaped.